United States Patent Office 3,246,157
Patented Apr. 12, 1966

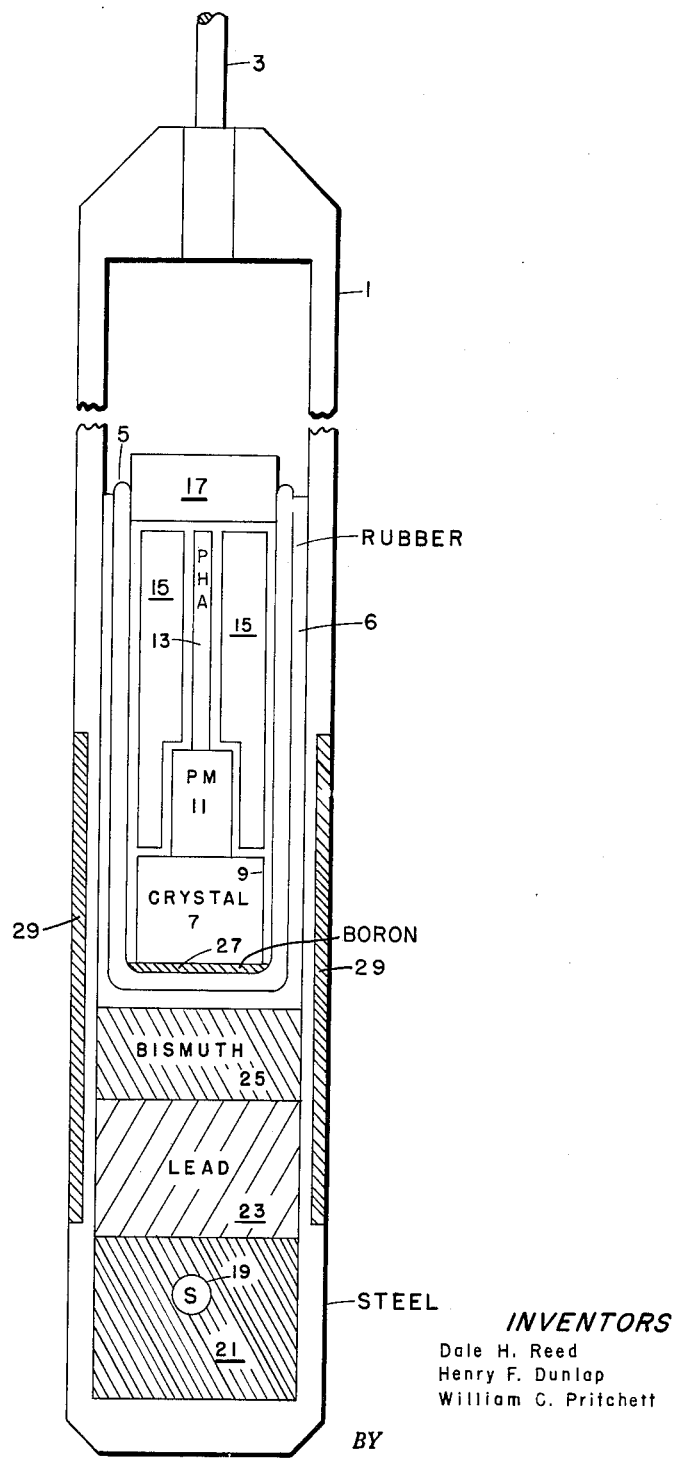

3,246,157
SHIELDING SYSTEM FOR A CHLORINE LOGGING APPARATUS
Dale H. Reed, Henry F. Dunlap, and William C. Pritchett, Dallas, Tex., assignors to The Atlantic Refining Company, Philadelphia, Pa., a corporation of Pennsylvania
Filed July 12, 1962, Ser. No. 209,352
4 Claims. (Cl. 250—108)

The present invention relates to an improved shielding system for a chlorine logging apparatus. More specifically, the present invention relates to a specific array of different metals arranged to minimize the detection of gamma rays that originate other than from the capture of thermal neutrons in the formation of interest.

Today, numerous combinations and configurations of different metals are used in shielding systems. These systems are designed to solve shielding problems associated with various types of radioactive logging. However, even with the large number of presently available shielding systems, there is no system available to properly shield chlorine logging detectors from borehole effects. In order to appreciate this problem, it is necessary to review the definitions of "chlorine logging" and "borehole effects." The chlorine curve used in chlorine logging operations is produced by bombarding a subsurface formation with fast neutrons and by measuring the formation's response in terms of prompt gamma rays of capture in a given energy range. More specifically formation fluids and certain elements in the formation moderate the fast neutrons until they reach thermal energy at which time they are subject to capture by various atoms making up the formation. As a result of such captures gamma rays are emitted and their energies are characteristic of formation elements performing the captures. Since chlorine is a principal capturer because of its large thermal neutron capture cross section, the formation's chlorine content can be determined by logging the count rate of gamma rays with energies characteristic of chlorine. This chlorine content curve, together with a conventional hydrogen content (neutron) curve, recorded separately or simultaneously is conventionally referred to as a chlorine log. The hydrogen content or neutron curve is diagnostic of formation porosity and the chlorine curve is diagnostic of chlorine content. As described in copending application, Serial No. 183,960, owned by a common assignee, now abandoned, the characteristic energy of gamma rays emitted by chlorine is 5 to 6.5 m.e.v., and the most accurate chlorine logging systems use this energy range. The term "borehole effects" refers to the adverse effects produced by well bore fluids, the well casing and cement or mud in the annulus. More specifically, thermal neutron flux established around the source end of the sonde in a manner well-known to those skilled in the art provides for thermal neutron captures in the neighborhood of the detector. Many of these moderated neutrons are captured by chlorine in the casing fluid, iron in the casing, and calcium in the cement or various elements in the mud depending on the material in the annulus. On capture of these thermal neutrons gamma rays in the chlorine energy range are emitted. Since these gamma rays are emitted very close to the detector they have a larger effect on the detected signal than gamma rays emitted at greater distances. In addition, since these gamma rays are not produced by the formation under investigation, the inclusion of such rays in the total count rate produces a false indication of salinity in the formations under investigation.

Presently available shielding systems do not prevent the inclusion of borehole effects in the chlorine curve. Although most systems are successful in preventing many gamma rays from traveling directly between the source and the detector, they either ignore or fail to shield properly against indirect gamma rays and gamma rays produced by borehole effects. The systems that try to shield against these gamma rays use materials inside the sonde in an attempt to absorb the thermal neutrons. With interior shielding, the sonde casing, usually steel or aluminum, increases the borehole effect by capturing thermal neutrons before they reach the inside shielding material.

Accordingly, it is an object of the present invention to provide an improved shielding system for a chlorine logging apparatus.

Another object of the present invention is to provide an improved shielding system that reduces borehole effects.

Another object of the present invention is to provide an improved shielding system that does not interfere with neutrons entering the formation.

Another object of the present invention is to prevent source originating gamma rays from reaching the detector.

Another object of the present invention is to provide an improved shielding system that absorbs thermal neutrons in a manner to produce minimum borehole effects.

Another object of the present invention is to provide a combination of shielding materials that cooperate to reduce to the minimum detection of gamma rays in the chlorine energy spectrum that originate from capturers other than in the formation of interest.

Other objects and advantages of this invention will become apparent from the following description taken in conjunction with the accompanying drawing, wherein the figure illustrates a cross section of the logging sonde and the improved shielding system. For purposes of clarity only the logging sonde and the shielding system are cross hatched.

Briefly, the invention comprises establishing the most effective gamma ray barrier between the detector and the radioactive source and of establishing the most effective thermal neutron absorber between the formation and the sonde and the detector and the source.

Refer now to the figure which shows the improved shielding system and its position in a logging sonde. Sonde 1 is shown supported by cable 3. Vacuum bottle 5 protected by rubber 6 contains crystal 7 housed in aluminum can 9 with an interior magnesium oxide coating, photomultiplier tube 11, pulse height analyzer circuit 13, cooling system 15 and thermal insulating stopper 17. Radioactive source 19 is located in metallic plug 21 at the lower end of the sonde. The improved shielding system includes lead shield 23, bismuth shield 25, boral wafer 27 and boral shield 29.

Lead shield 23 is used primarily to attenuate gamma rays from source 19. The type of radioactive source used determines to a certain extent the thickness of 23. That is, more lead is required for a radium beryllium source than a plutonium beryllium source since more gamma rays are generated from the former.

Because of its high density, lead is used very effectively as a gamma ray attenuator. However, on capture of thermal neutrons it does emit high energy gamma rays.

Bismuth shield 25 is positioned above the lead to stop the gamma rays emitted by the neutron captures in the lead. Additionally, the bismuth shield serves to stop gamma rays from the source.

Shield 29 can be any type of material containing boron such as boral, boron carbide, boron silicide, etc. Boron has a large capture cross section and "soaks" up thermal neutrons in a heavy particle reaction, i.e., no gamma rays emitted, before most other elements can capture them. The shield is placed as close to the formation as possible so that the thermal neutrons can be absorbed before they are captured by the casing fluid, the casing and the cement. The shield is made to encircle the outside circumference of the sonde and to extend from above the crystal to include most of lead shield 23. Shield 29's general configuration greatly reduces the number of thermal neutrons captured by borehole materials and effectively prevents thermal neutrons from being captured by the sonde. It should be noted that shield 29 is made flush with the outside diameter of the sonde to prevent hanging up on casing obstructions and to reduce wear on the shield.

Wafer 27 which can be made of any material suitable for use in shield 29 is positioned below the crystal as shown. Its purpose is to absorb thermal neutrons that have evaded shield 29 either by penetrating it or by coming up from below the crystal.

Metallic plug 21 acts as a housing for source 19 and can be any material suitable for holding a radioactive source that does not interfere with the fast neutrons leaving the source for the formation.

The minimum thickness of the various shields can vary according to the type of radioactive source used. The novel structural relationships of the shields shown in the drawing combine to produce an effective shielding for any type of radioactive source when thickness is adjusted for the particular kind of source. Experience has demonstrated that when there is on the order of 13.5 inches of lead at 23, 2.25 inches of bismuth at 25, 0.125 inch of boral at 29, and 0.37 inch of boral at 27 the shielding array can be used with a radium beryllium or a plutonium beryllium source. The distances recited above are longitudinal dimensions for 23, 25 and 27 and lateral or thickness dimension of 29. Thus, it is apparent that the longitudinal dimension of 25 is less than 23 and the longitudinal dimension of 27, in turn, is less than 25. The diameters of shields 23, 25 and 27 are determined by the inside diameter of the sonde at that point. The length and diameter of shield 29 have been previously mentioned.

To provide maximum shielding, the outside diameter of the shield section of the sonde should be as large as possible. This not only provides maximum shielding; it also displaces casing fluids from the neighborhood of the source-detector system.

Although the invention has been illustrated with a single crystal detecting system, application of the invention is not limited to such systems and the invention is only limited by the appended claims.

We claim:

1. A shielding array for a chlorine logging sonde having a neutron source at the lower end thereof and a detector including a scintillation crystal and a photomultiplier tube located above the source comprising:
    (a) a lead shield positioned between the neutron source and the scintillation crystal,
    (b) a bismuth shield having a longitudinal dimension less than said lead shield positioned above the adjacent to said lead shield, and
    (c) a boron shield located around the outside portion of the sonde at least opposite said scintillation crystal.

2. A shielding array for a chlorine logging sonde having a neutron source at the lower end thereof and a detector including a scintillation crystal and a photomultiplier tube located above the source comprising:
    (a) a lead shield positioned between the neutron source and the scintillation crystal,
    (b) a bismuth shield positioned above and adjacent to said lead shield, and
    (c) a boron shield located in a groove in the outside portion of the sonde encircling said scintillation crystal having an outside diameter substantially equal to the outside diameter of said sonde.

3. A shielding array for a chlorine logging sonde having a neutron source at the lower end thereof and a detector including a scintillation crystal and a photomultiplier tube located above the source comprising:
    (a) a lead shield positioned between the neutron source and the scintillation crystal,
    (b) a bismuth shield positioned above and adjacent to said lead shield,
    (c) a first boron shield located between said bismuth shield and said scintillation crystal, and
    (d) a second boron shield located around the outside portion of the sonde at least opposite said scintillation crystal.

4. A shielding array for a chlorine logging sonde having a neutron source at the lower end thereof and a detector including a scintillation crystal and a photomultiplier tube located above the source comprising:
    (a) a lead shield positioned between the neutron source and the scintillation crystal,
    (b) a bismuth shield positioned above and adjacent to said lead shield, and
    (c) a boron shield which encircles the outside portion of the sonde at least around said scintillation crystal.

References Cited by the Examiner

UNITED STATES PATENTS

| | | | |
|---|---|---|---|
| 2,769,918 | 11/1956 | Tittle | 250—108 X |
| 2,910,591 | 10/1959 | Baker | 250—108 X |
| 2,956,163 | 10/1960 | Baker | 250—108 X |
| 2,961,415 | 11/1960 | Axelrad | 250—108 X |

RALPH G. NILSON, *Primary Examiner.*

A. R. BORCHELT, *Examiner.*